United States Patent [19]
Sorensen

[11] Patent Number: 5,839,262
[45] Date of Patent: Nov. 24, 1998

[54] WHEELED WEED TRIMMER SUPPORT SYSTEM

[76] Inventor: Richard S. Sorensen, 30 Holly Hill Ct., Walnut Creek, Calif. 94596

[21] Appl. No.: 22,359

[22] Filed: Feb. 12, 1998

[51] Int. Cl.[6] .................................................. A01D 53/00
[52] U.S. Cl. .............................. 56/16.7; 30/276; 56/12.7; 56/16.9
[58] Field of Search .................... 30/276; 56/12.7, 56/16.9, 16.7, 17.2, 17.5, 256, 17.1, 320.1; 172/14, 15, 17

[56] References Cited

U.S. PATENT DOCUMENTS

| | | | |
|---|---|---|---|
| 4,389,836 | 6/1983 | Lowry et al. | 56/12.7 |
| 4,411,126 | 10/1983 | Lowry et al. | 56/17.5 |
| 4,688,376 | 8/1987 | Wolfe, Sr. | 56/16.7 |
| 4,879,869 | 11/1989 | Buckendorf, Jr. | 56/12.7 |
| 5,287,683 | 2/1994 | Smith | 56/12.7 |

*Primary Examiner*—Thomas B. Will
*Assistant Examiner*—Robert Pezzuto

[57] ABSTRACT

A wheeled weed trimmer support system is provided including a pair of wheel assemblies each having a frame with at least two wheels rotatably mounted thereon. Next provided is a support assembly mounted between the wheel assemblies and further adapted to support a wheel trimmer therebetween.

7 Claims, 3 Drawing Sheets

5,839,262

WHEELED WEED TRIMMER SUPPORT SYSTEM

BACKGROUND OF THE INVENTION

1. Field of the Invention

The present invention relates to weed trimmer supports and more particularly pertains to a new wheeled weed trimmer support system for supporting a weed trimmer via a pair of wheel assemblies.

2. Description of the Prior Art

The use of weed trimmer supports is known in the prior art. More specifically, weed trimmer supports heretofore devised and utilized are known to consist basically of familiar, expected and obvious structural configurations, notwithstanding the myriad of designs encompassed by the crowded prior art which have been developed for the fulfillment of countless objectives and requirements.

Known prior art weed trimmer supports include U.S. Pat. No. 5,287,683; U.S. Pat. No. 5,092,112; U.S. Pat. No. 5,095,687; U.S. Pat. No. 4,891,931; U.S. Pat. No. 4,922,694; and U.S. Pat. No. Des. 350,463.

In these respects, the wheeled weed trimmer support system according to the present invention substantially departs from the conventional concepts and designs of the prior art, and in so doing provides an apparatus primarily developed for the purpose of supporting a weed trimmer via a pair of wheel assemblies.

SUMMARY OF THE INVENTION

In view of the foregoing disadvantages inherent in the known types of weed trimmer supports now present in the prior art, the present invention provides a new wheeled weed trimmer support system construction wherein the same can be utilized for supporting a weed trimmer via a pair of wheel assemblies.

The general purpose of the present invention, which will be described subsequently in greater detail, is to provide a new wheeled weed trimmer support system apparatus and method which has many of the advantages of the weed trimmer supports mentioned heretofore and many novel features that result in a new wheeled weed trimmer support system which is not anticipated, rendered obvious, suggested, or even implied by any of the prior art weed trimmer supports, either alone or in any combination thereof.

To attain this, the present invention generally comprises a pair of wheel assemblies each having a frame with an oval configuration. The frame of each wheel assembly is defined by a lower linear bar and an upper linear bar coupled together via a pair of semicircular end portions. As such, the linear bars reside in parallel relationship within a single vertical plane. The upper linear bar of each wheel assembly has an auxiliary bar of a similar size and shape coupled at a pair of ends thereof to those of the upper linear bar. By this interconnection, the auxiliary bar and the upper linear bar reside in parallel relationship within a single horizontal plane and define a slot. The lower linear bar has three wheels rotatably coupled to an outer surface thereof. FIG. 3 shows a plurality of bolt units each including a lower portion with an intermediate extent slidable along the slot of the corresponding wheel assembly. The lower portion further has an enlarged upper and lower extent for maintaining the bolt unit situated vertically. For reasons that will become apparent hereinafter, each bolt unit further has a threaded upper portion. Further provided is a support assembly mounted between the wheel assemblies via the bolt units for supporting a wheel trimmer therebetween.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wheeled weed trimmer support system apparatus and method which has many of the advantages of the weed trimmer supports mentioned heretofore and many novel features that result in a new wheeled weed trimmer support system which is not anticipated, rendered obvious, suggested, or even implied by any of the prior art weed trimmer supports, either alone or in any combination thereof.

It is another object of the present invention to provide a new wheeled weed trimmer support system which may be easily and efficiently manufactured and marketed.

It is a further object of the present invention to provide a new wheeled weed trimmer support system which is of a durable and reliable construction.

An even further object of the present invention is to provide a new wheeled weed trimmer support system which is susceptible of a low cost of manufacture with regard to both materials and labor, and which accordingly is then susceptible of low prices of sale to the consuming public, thereby making such wheeled weed trimmer support system economically available to the buying public.

Still yet another object of the present invention is to provide a new wheeled weed trimmer support system which provides in the apparatuses and methods of the prior art some of the advantages thereof, while simultaneously overcoming some of the disadvantages normally associated therewith.

Still another object of the present invention is to provide a new wheeled weed trimmer support system for supporting a weed trimmer via a pair of wheel assemblies.

Even still another object of the present invention is to provide a new wheeled weed trimmer support system that includes a pair of wheel assemblies each having a frame with at least two wheels rotatably mounted thereon. Next provided is a support assembly mounted between the wheel assemblies and further adapted to support a wheel trimmer therebetween.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
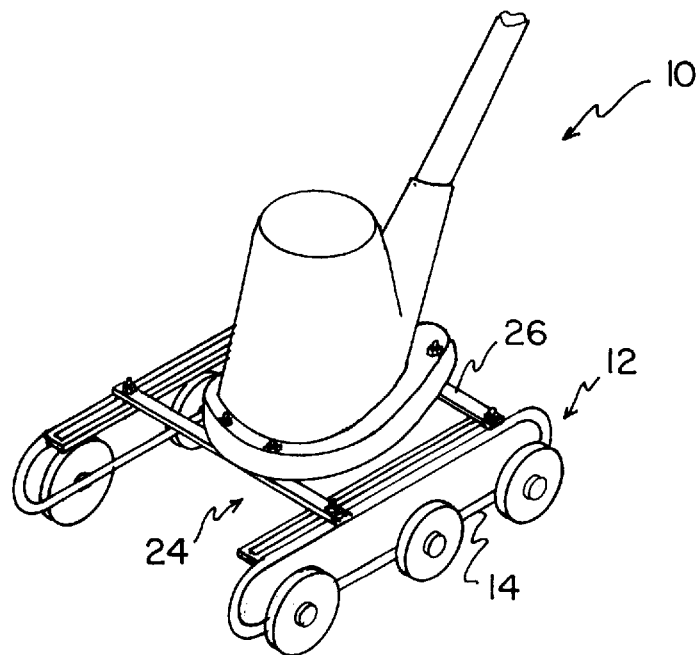
FIG. 1 is a perspective view of a new wheeled weed trimmer support system according to the present invention.

With reference now to the drawings, and in particular to FIGS. 1 through 5 thereof, a new wheeled weed trimmer support system embodying the principles and concepts of the present invention and generally designated by the reference numeral 10 will be described.

The present invention, designated as numeral 10, includes a pair of wheel assemblies 12 each having a frame 14 with an oval configuration. The frame of each wheel assembly is defined by a lower linear bar and an upper linear bar coupled together via a pair of semicircular end portions. As such, the linear bars of each frame reside in parallel relationship within a single vertical plane.

The upper linear bar of each wheel assembly has an auxiliary bar 16 of a similar size and shape coupled at a pair of ends thereof to those of the upper linear bar. By this interconnection, the auxiliary bar and the upper linear bar reside in parallel relationship within a single horizontal plane and define a slot. The lower linear bar has three wheels 18 rotatably coupled to an outer surface thereof. Each of the wheels are equally spaced, situated within a common plane and further have a height less than ½ that of the corresponding frame.

Figure 3:
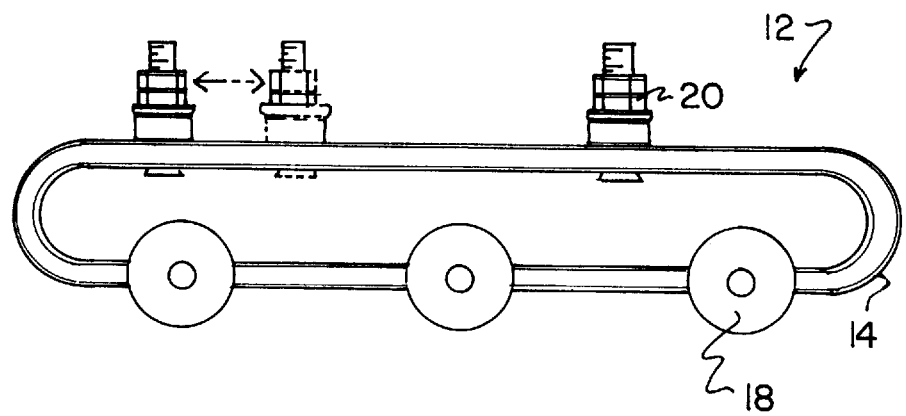
FIG. 3 is a side view of the frame of one of the wheel assemblies of the present invention.
Figure 4:
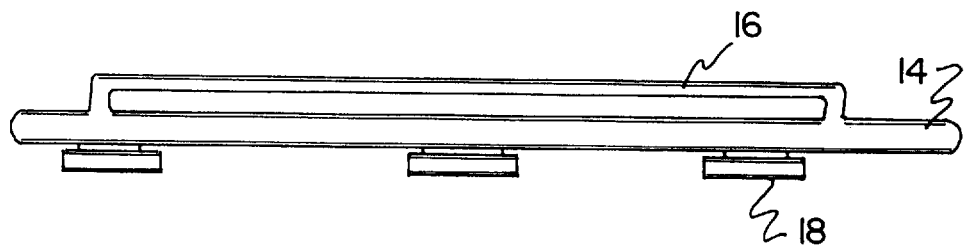
FIG. 4 is a top view of one of the wheel assemblies of the present invention.

FIG. 3 shows four bolt units 20 each including a lower portion with an intermediate extent slidable along the slot of the corresponding wheel assembly. The lower portion further has an enlarged upper and lower extent for maintaining the bolt unit situated vertically. For reasons that will become apparent hereinafter, each bolt unit further has a threaded upper portion.

FIG. 1 shows a first support assembly 24 including a pair of cross bars 26. Such cross bars each have a pair of ends with apertures formed therein for being removably coupled to the upper portion of a corresponding bolt unit. The cross bars function for supporting a first type of weed trimmer thereon via screws. Note FIG. 1. The second support assembly further maintains the wheel assemblies in parallel relationship.

Figure 2:
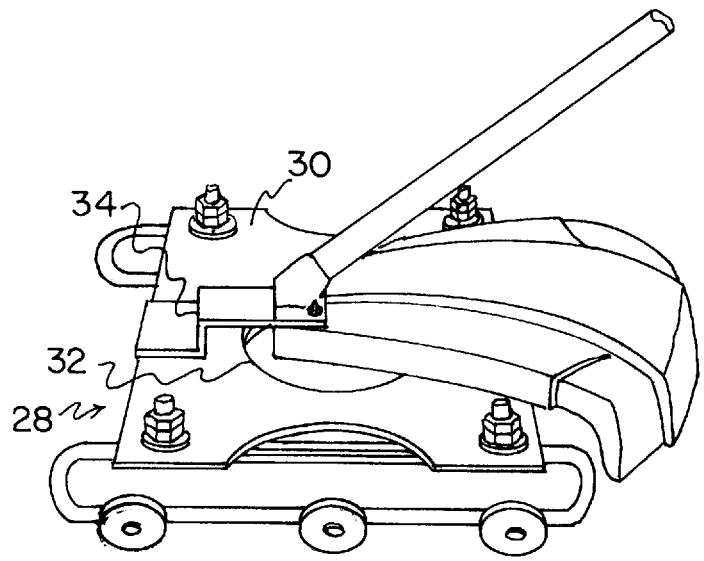
FIG. 2 is a perspective view of the present invention showing the second support assembly.

As shown in FIG. 2, a second support assembly 28 is provided including a plate 30 having a square configuration and an aperture formed in each of four corners thereof. Each of these apertures are adapted for being removably coupled to the upper portion of a corresponding bolt unit for maintaining the wheel assemblies in parallel relationship.

The plate of the second support assembly has a circular cut out 32 formed in a central extent thereof for allowing the passage of a bottom of a second type of weed trimmer therethrough. The second support assembly further includes a coupling tab 34 coupled to a front edge of the plate. A horizontal extent of the coupling tab extends over the cut out for mounting to the second type of weed trimmer. See FIG. 2.

Figure 5:
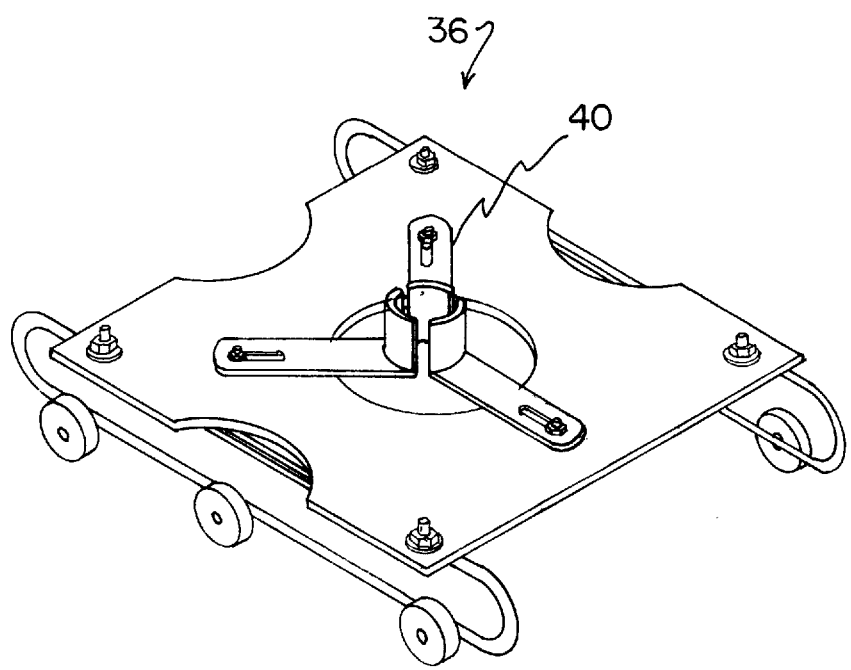
FIG. 5 is a perspective view of the present invention with the third support assembly.

With reference now to FIG. 5, a third support assembly 36 includes a plate having a square configuration and an aperture formed in each of four corners thereof. Similar to those of the second support assembly, each of the apertures serve for being removably coupled to the upper portion of a corresponding bolt unit. As such, the wheel assemblies are maintained in parallel relationship. The plate has a circular cut out formed in a central extent thereof. A plurality of bores are formed about the cut out for supporting coupling bolts therein.

The third support assembly further includes a plurality of coupling arms 40 each with a horizontal portion having an inboard end. Such inboard end has an elongated slot formed therein for coupling with a corresponding one of the coupling bolts. In use, the coupling arms extend radially with respect to the cut out of the plate. Each coupling arm further includes a vertical portion which defines a portion of a vertically oriented cylinder. Each vertical portion is coupled to an outboard end of the associated coupling arm and is further extended upwardly therefrom.

By this design, the coupling arms are adapted for encompassing a post of a third type of weed trimmer. In use, the coupling bolts may be tightened to secure the coupling arms about the post. It should be noted that by the foregoing structure, a height of the weed trimmer is adjustable. See FIG. 5.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wheeled weed trimmer support system comprising, in combination:

a pair of wheel assemblies each including a frame with an oval configuration defined by a lower linear bar and an upper linear bar coupled together via a pair of semi-circular end portions such that the linear bars reside in parallel relationship within a single vertical plane, the upper linear bar of each wheel assembly having an auxiliary bar of a similar size and shape coupled at a pair of ends thereof to those of the upper linear bar such that the auxiliary bar and the upper linear bar reside in parallel relationship within a single horizontal plane and define a slot, wherein the lower linear bar has three wheels rotatably coupled to an outer surface thereof;

a plurality of bolt units each including a lower portion with an intermediate extent slidable along the slot of the corresponding wheel assembly, the lower portion further having an enlarged upper and lower extent for maintaining the bolt unit situated vertically, each bolt unit further having a threaded upper portion;

a first support assembly including a pair of cross bars each having a pair of ends with apertures formed therein for being removably coupled to the upper portion of a corresponding bolt unit for supporting a first type of weed trimmer thereon and further maintaining the wheel assemblies in parallel relationship;

a second support assembly including a plate having a square configuration and an aperture formed in each of four corners thereof each for being removably coupled to the upper portion of a corresponding bolt unit for maintaining the wheel assemblies in parallel relationship, the plate having a circular cut out formed in a central extent thereof for allowing the passage of a bottom of a second type of weed trimmer therethrough, the second support assembly further including a coupling tab coupled to a front edge of the plate with a horizontal extent extending over the cut out for mounting to the second type of weed trimmer; and a third support assembly including a plate having a square configuration and an aperture formed in each of four corners thereof each for being removably coupled to the upper portion of a corresponding bolt unit for maintaining the wheel assemblies in parallel relationship, the plate having a circular cut out formed in a central extent thereof and a plurality of bores formed about the cut out for supporting coupling bolts therein, the third support assembly further including a plurality of coupling arms each with a horizontal portion with an inboard end having an elongated slot formed therein for coupling with a corresponding one of the coupling bolts and extending radially with respect to the cut out of the plate, each coupling arm further including a vertical portion which defines a portion of a cylinder and is coupled to an outboard end of the coupling arm and extended upwardly therefrom for encompassing a post of a third type of weed trimmer, wherein the coupling bolts may be tightened to secure the coupling arms about the post.

2. A wheeled weed trimmer support system comprising:

a pair of wheel assemblies each including a frame with at least two wheels rotatably mounted thereon; and a support assembly mounted between the wheel assemblies and further adapted to support a wheel trimmer therebetween.

3. A wheeled weed trimmer support system as set forth in claim 2 wherein the support assembly is slidably connected to the wheel assemblies.

4. A wheeled weed trimmer support system as set forth in claim 2 wherein the support assembly is connected to a vertical portion of the weed trimmer.

5. A wheeled weed trimmer support system as set forth in claim 2 wherein the support assembly includes a plate with a cut out for allowing the passage of the weed trimmer therethrough.

6. A wheeled weed trimmer support system as set forth in claim 2 wherein each frame includes an upper and lower linear bar each coupled together in a vertical plane.

7. A wheeled weed trimmer support system as set forth in claim 2 wherein the support assembly is removably coupled to the wheel assemblies.

* * * * *